US010905955B2

(12) United States Patent
Lin et al.

(10) Patent No.: US 10,905,955 B2
(45) Date of Patent: Feb. 2, 2021

(54) TARGET POSITIONING METHOD AND APPARATUS IN VIRTUAL INTERACTIVE SCENE

(71) Applicant: Tencent Technology (Shenzhen) Company Limited, Shenzhen (CN)

(72) Inventors: Xia Lin, Shenzhen (CN); Dong Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/555,333

(22) Filed: Aug. 29, 2019

(65) Prior Publication Data

US 2019/0381403 A1 Dec. 19, 2019

Related U.S. Application Data

(63) Continuation of application No. PCT/CN2018/107007, filed on Sep. 21, 2018.

(30) Foreign Application Priority Data

Sep. 21, 2017 (CN) .......................... 2017 1 0857550

(51) Int. Cl.
*A63F 13/426* (2014.01)
*A63F 13/837* (2014.01)
(Continued)

(52) U.S. Cl.
CPC .......... *A63F 13/426* (2014.09); *A63F 13/837* (2014.09); *G06F 3/011* (2013.01);
(Continued)

(58) Field of Classification Search
CPC ...... G06F 3/011; G06T 19/006; A63F 13/837; A63F 13/426
See application file for complete search history.

(56) References Cited

U.S. PATENT DOCUMENTS 6,540,612 B1 * 4/2003 Miyamoto .............. A63F 13/10
463/31
8,542,910 B2 * 9/2013 Leyvand ............ G06K 9/00342
382/154
(Continued)

FOREIGN PATENT DOCUMENTS

CN        102448562 A     5/2012
CN        107029425 A     8/2017
(Continued)

OTHER PUBLICATIONS

International Search Report, issued in International Application PCT/CN2018/107007, dated Dec. 27, 2018, pp. 1-2, State Intellectual Property Office of the P.R. China, Beijing, China.

*Primary Examiner* — Steve Rowland
(74) *Attorney, Agent, or Firm* — Brinks Gilson & Lione

(57) ABSTRACT

A device may intercept a triggering operation for target positioning in the virtual interactive scene; obtain a location of a triggering point on a screen. The device may determine a plurality of adsorption point locations based on the location of the triggering point and a plurality of adsorption points on a virtual target, the adsorption point locations respectively associated with the adsorption points. The device may generate, in response to the location of the triggering point being within an adsorption range of at least one of the adsorption point locations, a plurality of adsorption point weight values corresponding to the adsorption points. The device may adjust the triggering point to an adsorption point location at which an adsorption point corresponding to a largest adsorption point weight value is located. Flexibility of target positioning in the virtual interactive scene may be effectively enhanced.

19 Claims, 9 Drawing Sheets

(51) Int. Cl.
   *G06F 3/01*    (2006.01)
   *G06F 3/033*   (2013.01)
   *G06K 9/00*    (2006.01)
   *G06T 13/80*   (2011.01)
   *G06T 19/00*   (2011.01)

(52) U.S. Cl.
   CPC ......... *G06F 3/033* (2013.01); *G06K 9/00342* (2013.01); *G06T 13/80* (2013.01); *G06T 19/006* (2013.01)

(56) References Cited

U.S. PATENT DOCUMENTS

| | | |
|---|---|---|
| 8,660,310 B2 | 2/2014 | Mathe |
| 2009/0013274 A1* | 1/2009 | Haghanegi ............... A63F 13/42 715/764 |
| 2009/0325660 A1* | 12/2009 | Langridge ............... A63F 13/42 463/2 |
| 2010/0130333 A1* | 5/2010 | Strong ................. A63B 69/004 482/83 |
| 2011/0080475 A1* | 4/2011 | Lee .................... G06K 9/00355 348/77 |
| 2012/0051588 A1* | 3/2012 | McEldowney ........ G03B 21/14 382/103 |
| 2013/0196767 A1* | 8/2013 | Garvin .................... A63F 13/04 463/36 |
| 2016/0158641 A1* | 6/2016 | Summons ............. A63F 13/219 463/31 |

FOREIGN PATENT DOCUMENTS

| | | |
|---|---|---|
| CN | 109529327 A | 3/2019 |
| JP | 2001006000 A | 1/2001 |
| WO | WO 2019/057164 A1 | 3/2019 |

\* cited by examiner

TARGET POSITIONING METHOD AND APPARATUS IN VIRTUAL INTERACTIVE SCENE

CROSS REFERENCE TO RELATED APPLICATIONS

This application is a continuation of International Application PCT/CN2018/107007, filed Sep. 21, 2018, which claims priority to Chinese Patent Application No. 201710857550.9, filed on Sep. 21, 2017, both of which are incorporated herein by reference in their entirety.

TECHNICAL FIELD

The present disclosure relates to the field of computer technologies, and in particular, to a target positioning method and apparatus in a virtual interactive scene, and an electronic device.

BACKGROUND

With the development of computer technologies, virtual interactive scenes constructed using a first person gradually come into the view of users. For example, the virtual interactive scenes may include shooting game scenes and hitting game scenes. Using a shooting game scene as an example, a user plays an aiming and shooting game through a user-controlled object created using a first person in the shooting game scene, that is, a virtual target is aimed by using a subjective perspective of the user, to shoot the virtual target.

SUMMARY

Aspects of the present disclosure provide various methods and apparatuses, computer storage mediums, devices, and systems By way of introductory example, a first aspect of the system may include a method for target positioning in a virtual interactive. The method may include intercepting a triggering operation for target positioning in the virtual interactive scene. The method may include obtaining a location of a triggering point on a screen. The method may include determining a plurality of adsorption point locations based on the location of the triggering point and a plurality of adsorption points on a virtual target, the adsorption point locations respectively associated with the adsorption points. The method may include generating, in response to the location of the triggering point being within an adsorption range of at least one of the adsorption point locations, a plurality of adsorption point weight values corresponding to the adsorption points. The method may include adjusting the triggering point to an adsorption point location at which an adsorption point corresponding to a largest adsorption point weight value is located.

A second aspect of the present disclosure may include a device. The device may intercept a triggering operation for target positioning in the virtual interactive scene; obtain a location of a triggering point on a screen. The device may determine a plurality of adsorption point locations based on the location of the triggering point and a plurality of adsorption points on a virtual target, the adsorption point locations respectively associated with the adsorption points. The device may generate, in response to the location of the triggering point being within an adsorption range of at least one of the adsorption point locations, a plurality of adsorption point weight values corresponding to the adsorption points. The device may adjust the triggering point to an adsorption point location at which an adsorption point corresponding to a largest adsorption point weight value is located.

A third aspect of the present disclosure may include a non-transitory computer readable medium comprising instructions executable by the processor. The instructions may cause the processor to obtain a location of a triggering point on a screen. The instructions may cause the processor to determine a plurality of adsorption point locations based on the location of the triggering point and a plurality of adsorption points on a virtual target, the adsorption point locations respectively associated with the adsorption points. The instructions may cause the processor to generate, in response to the location of the triggering point being within an adsorption range of at least one of the adsorption point locations, a plurality of adsorption point weight values corresponding to the adsorption points. The instructions may cause the processor to adjust the triggering point to an adsorption point location at which an adsorption point corresponding to a largest adsorption point weight value is located.

Additional or alternative aspects and technical advancements are provided in the present disclosure.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

While various embodiments have been described, it will be apparent to those of ordinary skill in the art that many more embodiments and implementations are possible. Accordingly, the embodiments described herein are examples, not the only possible embodiments and implementations.

Figure 1:
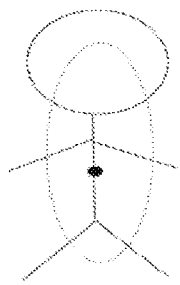
FIG. 1 is a schematic diagram of an adsorption point in the related technology.

An adsorption point may include set at a fixed location of a virtual target. Using an example in which the virtual target is an animation character for description, as shown in FIG. 1, the adsorption point is set on a body of the animation character. Therefore, automatic adsorption comes into effect only when a triggering point approaches the adsorption point on the body of the animation character.

Affected by the perspective of the user, aiming of the virtual target may deviate, causing inaccurate shooting of the virtual target. For this, the related technology proposes a target positioning method, that is, an adsorption point is set on a virtual target, when a triggering point for pointing to the virtual target approaches the adsorption point, and the triggering point is automatically adsorbed to the adsorption point set by the virtual target, to automatically aim the virtual target in a shooting game scene, to assist the user accurately complete target positioning.

Because the adsorption point is usually set at a fixed location of the virtual target, automatic adsorption comes into effect only when the triggering point approaches the fixed location. Otherwise, accurate aiming of the virtual target may still be caused.

The target positioning method in the related technology still has a defect of lack of flexibility. For this, the present disclosure proposes a target positioning method in a virtual interactive scene. According to the target positioning method in the virtual interactive scene, flexibility of target positioning is effectively enhanced.

An example of a technical advancement achieved by the embodiments described herein is a plurality of adsorption points may be set on a virtual target, and a triggering point for indicating the virtual target is made to approach any adsorption point, to trigger the triggering point to be automatically adsorbed to one adsorption point, to assist a user accurately complete target positioning.

For example, a triggering operation for performing target positioning by a user is intercepted, a location of a triggering point in a screen is obtained, determining of adsorption point locations is triggered according to the location of the triggering point and a plurality of adsorption points, and in a case that the location of the triggering point is in an adsorption range determined by any adsorption point location, adsorption point weight value computing is performed on the plurality of adsorption points, to obtain a plurality of adsorption point weight values corresponding to the adsorption points, to move or adjust the triggering point to an adsorption point location at which an adsorption point corresponding to a largest adsorption point weight value is located. Therefore, automatic adsorption can come into effect in a case that the triggering point approaches any adsorption point, thereby effectively enhancing flexibility of target positioning in a virtual interactive scene.

In addition, the triggering point is automatically adsorbed to the adsorption point having the largest adsorption point weight value. If the adsorption point weight value corresponding to the adsorption point changes, automatic adsorption of the triggering point accordingly changes. For the user, a location at which automatic adsorption is triggered is no longer constant, thereby further enhancing flexibility of target positioning.

Figure 2:
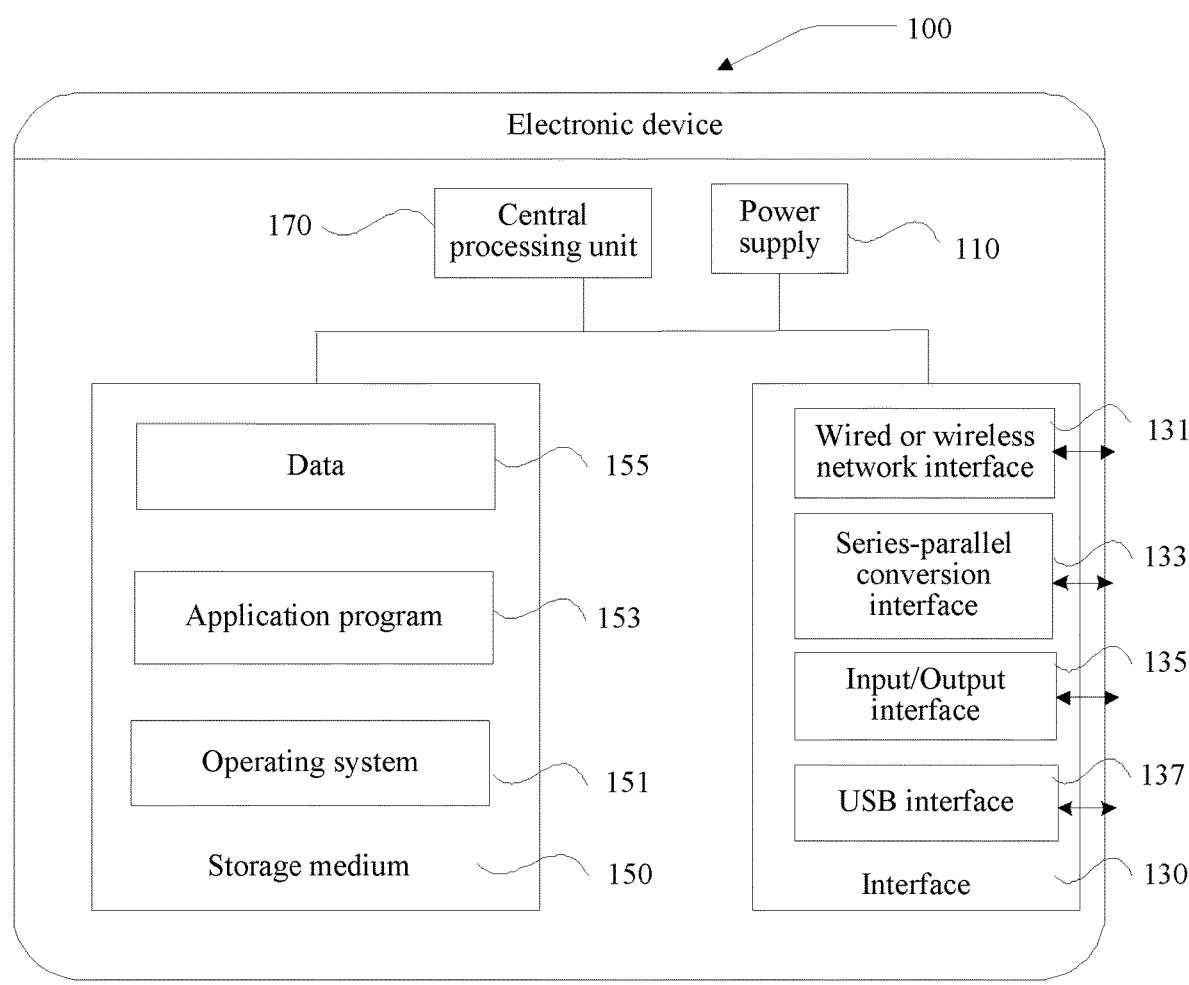
FIG. 2 is a schematic diagram of a hardware structure of an electronic device according to an exemplary embodiment.

FIG. 2 is a schematic diagram of a hardware structure of an electronic device 100 according to an exemplary embodiment. The electronic device 100 may be a smartphone, a computer, a tablet computer, and the like. This is not limited herein.

The electronic device 100 is an example adapted to the present disclosure and cannot be considered to provide any limitation on the use scope of the present disclosure. The electronic device 100 cannot be explained as relying on or necessarily having one or more components in the exemplary electronic device 100 shown in FIG. 2.

The hardware structure of the electronic device 100 may greatly vary due to different configurations or performance. As shown in FIG. 2, the electronic device 100 includes: a power supply 110, an interface 130, at least one storage medium 150, and at least one central processing unit (CPU) 170.

The power supply 110 is configured to provide a working voltage to hardware devices on the electronic device 100.

The interface 130 includes at least one wired or wireless network interface 131, at least one series-parallel conversion interface 133, at least one input/output interface 135, at least one USB interface 137, and the like, configured to communicate with an external device.

The storage medium 150 is used as a carrier of resource storage and may be a random storage medium, a magnetic disc, an optical disk, and the like, and resources stored in the storage medium 150 include an operating system 151, an application program 153, data 155, and the like. A storage manner may be transient storage or permanent storage. In some examples, the storage medium 150 may include a non-transitory computer readable storage medium. The operating system 151 is configured to manage and control hardware devices on the electronic device 100 and the application program 153, so that the central processing unit 170 calculates and processes massive data 155, and the operating system 151 may be Windows Server™, Mac OS X™, Unix™, Linux™, FreeBSD™, and the like. The application program 153 is a computer program that completes at least one particular job based on the operating system 151 and may include at least one logical component (not shown in FIG. 2). Each logical component may include a series of operation instructions for the electronic device 100. The data 155 may be a photo, a picture, and the like stored in a magnetic disc.

The central processing unit 170 may include one or more processors and is configured to communicate with the storage medium 150 through a bus, to compute and process massive data 155 in the storage medium 150.

As described in detail above, the electronic device 100 applicable to the present disclosure performs automatic aiming in a shooting game by reading, by the central processing unit 170, a series of operation instructions stored in the storage medium 150.

In addition, the present disclosure can also be implemented through a hardware circuit or by combining a hardware circuit and a software instruction. Therefore, implementation of the present disclosure is not limited to any particular hardware circuit, software, or a combination thereof.

Figure 3:
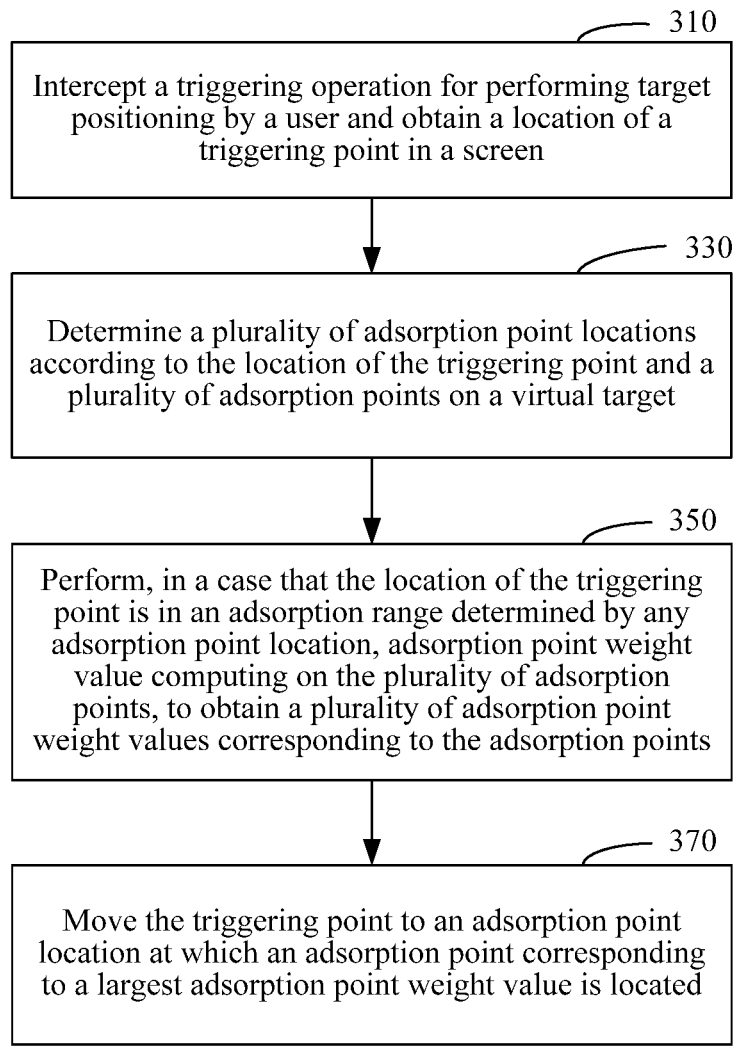
FIG. 3 is a flowchart of a target positioning method in a virtual interactive scene according to an exemplary embodiment.

Referring to FIG. 3, in an exemplary embodiment, a target positioning method in a virtual interactive scene is applicable to the electronic device 100 shown in FIG. 2. The target positioning method in a virtual interactive scene may be performed by the electronic device 100 and may include the following steps:

Step 310: Intercept a triggering operation for performing target positioning by a user and obtaining a location of a triggering point in a screen.

In a virtual interactive scene constructed using a first person in the electronic device, the virtual target may be a virtual object such as a person, an animal, an object, a mountain, a river, and a building in the virtual interactive scene. In other words, the virtual target is a virtual object that is triggered by the user in the virtual interactive scene to perform target positioning. For example, in a hitting game scene, to execute a boat explosion task, the user performs target positioning on the virtual object: a boat.

Correspondingly, the user performs target positioning on the virtual object by controlling an input apparatus configured by the electronic device, such as a keyboard, a mouse, a game joystick, a stylus, or a touchscreen. The triggering operation for performing target positioning by the user may be triggered by controlling, by the user, the input apparatus. The triggering point corresponds to the triggering operation performed by controlling, by the user, the input apparatus and is used for pointing to the virtual object on which the user triggers performing target positioning.

Descriptions are provided below by way of example. In a target positioning, that the user triggers performing target positioning on the virtual object is aiming a target enemy by controlling, by a user-controlled object, an aim point of a device such as a firearm using a user perspective.

When the target enemy is aimed and shot, first, the user slides on a touchscreen with a finger to move the aim point from any random location to a certain range near the target enemy, to aim the target enemy. When the aim point remains in the certain range near the target enemy, the user shoots the aimed target enemy through a click operation (for example, softly touching the touchscreen).

In the foregoing process, the aim point is moved and has a movement tendency to pointing to the target enemy. Therefore, the aim point may be regarded as the triggering point. That is, in the shooting game scene, the triggering point corresponds to a slide operation performed by a user finger on the touchscreen and is used for pointing to the target enemy aimed by the user.

Further, in the shooting game scene, to assist the user accurately aim the target enemy, to ensure a hit rate when the user shoots the target enemy, aiming of the target enemy further includes automatic aiming, that is, the user does not accurately control aiming but only needs to make the aim point in a certain range near the target enemy. When the user makes the aim point in a certain range near the target enemy, the aim point is automatically adsorbed to an adsorption point set on a body of the target enemy. That is, a premise for automatic adsorption to come into effect is that the aim point approaches the adsorption point, that is, the triggering point approaches the adsorption point.

For this, before the automatic adsorption, locations of the triggering point and the adsorption point in a screen first need to be determined, to determine whether the triggering point approaches the adsorption point. The automatic adsorption is triggered only when the triggering point approaches the adsorption point.

As stated above, the triggering point is moved from any other location to a certain range near the virtual target, and has a movement tendency to pointing to the virtual target in a movement process, and finally remains in the certain range near the virtual target.

Therefore, in the foregoing process, the triggering operation for performing target positioning by the user may be continuously detected, to obtain a location of the triggering point in the screen in a whole movement process, including a location of the triggering point in the screen during movement and a location of the triggering point in the screen that remains. Therefore, whether the triggering point approaches the adsorption point on the virtual target can be determined according to the location of the triggering point in the screen.

In a specific implementation of an embodiment, whether the triggering point approaches the adsorption point on the virtual target is determined according to the location of the triggering point in the screen that remains, to accurately initiate automatic adsorption of the triggering point in time. In addition, a task processing pressure of the processor is also reduced, thereby improving target positioning efficiency.

A detection function of detecting the location of the triggering point in the screen is preset. For example, a Mouse Position function may obtain a remaining location of a cursor in the screen. Details are not listed one by one herein. The preset function may be directly called by the electronic device.

In addition, the location of the triggering point in the screen may be represented by coordinate values.

Step 330: Determine a plurality of adsorption point locations according to the location of the triggering point and a plurality of adsorption points on a virtual target.

After the location of the triggering point is determined, the adsorption point locations corresponding to the adsorption points on the virtual target are further determined. The virtual target is pointed to by the triggering point. That is, the virtual target on which the user triggers performing target positioning is first determined through the location of the triggering point, to determine the corresponding adsorption point locations according to the adsorption points on the virtual target.

For the plurality of adsorption points on the virtual target, each adsorption point corresponds to an adsorption point location.

Specifically, the adsorption points on the virtual target are obtained from a configuration parameter file, and locations of the adsorption points in the screen are detected, to obtain the adsorption point locations corresponding to the adsorption points.

For example, a client for the virtual interactive scene to present is run in the electronic device. The configuration parameter file is an xml file in a parameter (preference) catalog in the client and is used for storing configured parameters. For example, the parameters include but are not limited to the adsorption points set on the virtual objects in the virtual interactive scene.

The adsorption point is uniquely represented by an adsorption point identifier in the configuration parameter file. The adsorption point identifier may be represented by numbers, letters, or a combination thereof. This is not limited herein. For example, an adsorption point A1 and an adsorption point A2 are set on a virtual object A, and A1 and A2 are adsorption point identifiers.

Certainly, in other embodiments, the configuration parameter file correspondingly stores selections make by a user when preparing to enter the virtual interactive scene, using a shooting game scene as an example, the made selections include a user-controlled object, a firearm type specified by the user, a shooting level that the user specifies to enter, and the like. In addition, some other inherent configuration parameters of a game are also stored. For example, the configuration parameters include a movement velocity of the virtual object and the like. The user-controlled object is a virtual object created using a first person in the virtual interactive scene. That is, the user-controlled object is a virtual object substituted or controlled by the user using a first person.

Further, assuming that the virtual target is an animation character, it may be understood that an animation posture corresponding to the animation character changes. For example, the animation posture of the animation character changes from standing to lying down. Correspondingly, the adsorption point locations corresponding to the adsorption points set on the animation character accordingly change. That is, the adsorption point locations are associated with the animation posture of the animation character.

Step 350: Perform, in a case that the location of the triggering point is in an adsorption range determined by any adsorption point location, adsorption point weight value computing on the plurality of adsorption points, to obtain a plurality of adsorption point weight values corresponding to the adsorption points.

The adsorption range is a range defined by using the adsorption point locations as a circle center and a preset distance as a radius.

For the plurality of adsorption point locations obtained in step 330, in a case that the location of the triggering point is in a range defined by any adsorption point location, the location of the triggering point is considered to be within the adsorption range determined by the any adsorption point location. In this case, automatic adsorption comes into effect, that is, the triggering point is automatically adsorbed to an adsorption point corresponding to one adsorption point location.

The automatic adsorption may be performed according to an adsorption point corresponding to an adsorption point location that is nearest to the location of the triggering point or may be performed according to priorities of the adsorption points.

Further, the priorities may be correspondingly set according to different adsorption point locations or may be correspondingly set according to different firearm types specified by the user.

Figure 4:
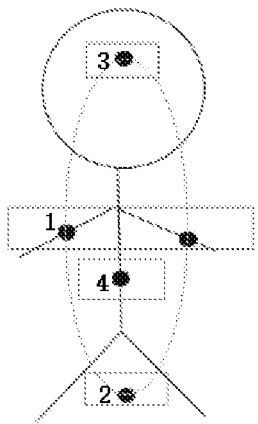
FIG. 4 is a schematic diagram of an adsorption point in the present disclosure.

For example, still using the virtual target as the animation character for description, as shown in FIG. 4, assuming that five adsorption points, which are respectively located on a head, a body, a leg, a left hand, and a right hand, are set on the animation character, the five adsorption points are correspondingly the body, the head, the leg, and two hands (the left hand and the right hand) according to a priority sequence. That is, priorities of adsorption points whose adsorption point locations are on middle three parts of the animation character are all higher than priorities of adsorption points whose adsorption point locations are on parts on two sides of the animation character.

Alternatively, when the firearm type specified by the user is a sniper rifle, a priority of an adsorption point on the head of the animation character is higher than priorities of other adsorption points on a body of the animation character. In this embodiment, the priorities of the adsorption points are represented by adsorption point weight values. For this, before the automatic adsorption is performed, the adsorption point weight values corresponding to the adsorption points need to be obtained, to learn of the priorities corresponding to the adsorption points, to move the triggering point to an adsorption point location at which an adsorption point with a highest priority is located.

For example, still using the foregoing example for description, assuming that a priority of an adsorption point on the head is higher than priorities of adsorption points on the body, the triggering point is automatically adsorbed to the adsorption point on the head.

The adsorption point weight value is related to the adsorption point location at which the adsorption point is located, the firearm type, and whether the adsorption point is visible.

Further, in a process of obtaining the adsorption point weight value, the adsorption point weight value may be dynamically configured according to the adsorption point location at which the adsorption point is located, the firearm type, and whether the adsorption point is visible.

Step 370: Move the triggering point to an adsorption point location at which an adsorption point corresponding to a largest adsorption point weight value is located.

After the triggering point is automatically adsorbed to the adsorption point corresponding to the largest adsorption point weight value, the user is assisted to complete target positioning.

Through the foregoing process, the plurality of adsorption points is set on the virtual object. When the virtual object becomes the virtual target through the triggering operation for performing target positioning by the user, automatic adsorption is triggered provided that the triggering point approaches any adsorption point on the virtual target. That is, the triggering point is automatically adsorbed to the adsorption point having the largest adsorption point weight value according to the adsorption point weight value, so that for the user, the adsorption point is not set at a fixed location of the virtual target but has a variable adsorption point location. Any adsorption point may be automatically adsorbed by the triggering point, to effectively enhance flexibility of target positioning.

In addition, different adsorption points correspond to different adsorption point weight values. The triggering point only moves to the adsorption point having the largest adsorption point weight value. If the adsorption point weight value changes, the automatic adsorption of the triggering point accordingly changes, thereby further enhancing flexibility of target positioning.

In an exemplary embodiment, the virtual target is an animation character and is represented by a plurality of animation skeleton points. The animation character includes a person character, an animal character, and the like.

First, when the virtual target is an animation character, an animation manner of using a skeleton animation as the animation character is used, that is, in the skeleton animation, "skeletons" connected to each other compose a framework structure of the animation character, and an animation is generated for the animation character by changing orientations and locations of the "skeletons" in the framework structure, so that the animation character is displayed on the screen with different animation postures.

Based on the above, the virtual target is represented by a plurality of animation skeleton points when the virtual target is an animation character. For example, an animation skeleton point A is used to represent a head of the animation character, and an animation skeleton point B is used to represent a left hand of the animation character. In other words, the animation skeleton point uniquely identifies different parts on the animation character.

Figure 5:
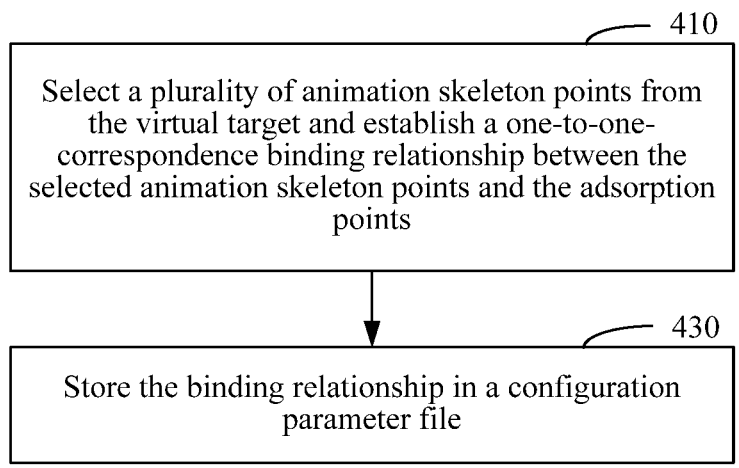
FIG. 5 is a flowchart of another target positioning method in a virtual interactive scene according to an exemplary embodiment.

Correspondingly, referring to FIG. 5, before step 330, the foregoing method may further include the following steps:

Step 410: Select a plurality of animation skeleton points from the virtual target and establish a one-to-one-correspondence binding relationship between the selected animation skeleton points and the adsorption points.

Step 430: Store the binding relationship in a configuration parameter file, the configuration parameter file being used for determining the adsorption point locations.

For example, five adsorption points are predefined. The five adsorption points are prepared to be set on the head, the body, the leg, the left hand, and the right hand of the animation character.

Correspondingly, five animation skeleton points are selected from the animation character, and the five animation skeleton points respectively identify different parts on the animation character: the head, the body, the leg, the left hand, and the right hand.

Further, the one-to-one correspondence binding relationship between the five animation skeleton points and the five adsorption points is established, and the binding relationship is stored in the configuration parameter file.

Hence, the five adsorption points are preset on the animation character. In addition, when the animation posture of the animation character changes, because the locations of the animation skeleton points change, the adsorption point locations at which the adsorption points are located change with the locations of the animation skeleton points.

In other words, regardless of how the animation posture of the animation character changes, the five adsorption points preset on the body of the person always exist, so that automatic adsorption of the triggering point can change as the animation posture of the animation character changes, thereby fully ensuring effectiveness of target positioning.

Figure 6:
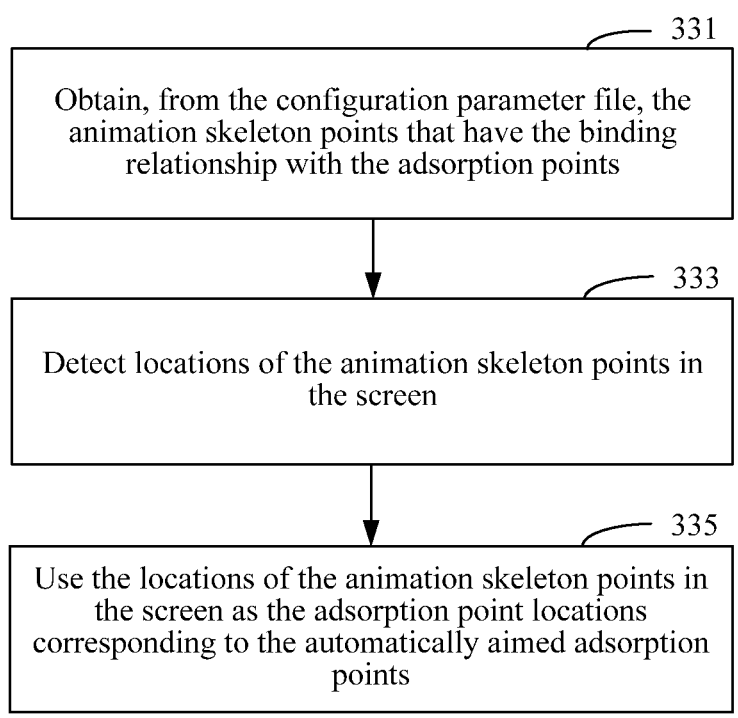
FIG. 6 is a flowchart of step 330 in an embodiment corresponding to FIG. 3 in an embodiment.

Further, referring to FIG. 6, step 330 may include the following steps:

Step 331: Obtain, from the configuration parameter file, the animation skeleton points that have the binding relationship with the adsorption points.

Step 333: Detect locations of the animation skeleton points in the screen.

Step 335: Use the locations of the animation skeleton points in the screen as the adsorption point locations corresponding to the adsorption points.

As stated above, when the animation posture of the animation character changes, because the locations of the animation skeleton points change, the adsorption point locations at which the adsorption points are located change with the locations of the animation skeleton points.

Therefore, the adsorption point locations corresponding to the adsorption points are locations of the animation skeleton points that have the binding relationship with the adsorption points.

Specifically, the animation skeleton points that have the binding relationship with the adsorption points are first obtained through the one-to-one correspondence binding relationship between the five animation skeleton points and the five adsorption points that is stored in the configuration parameter file, and locations of the animation skeleton points in the screen are detected, to use the detected locations of the animation skeleton points in the screen as the adsorption point locations corresponding to the adsorption points.

Further, the locations of the animation skeleton points may be detected in real time or periodically. This is not limited herein and may be flexibly adjusted according to an actual application scenario. For example, in a shooting game scene that has strong mobility, a detection period of the locations of the animation skeleton points is short.

The locations of the animation skeleton points in the screen are represented by using coordinate values.

Character animations of the adsorption points are bound by cooperation of the foregoing embodiments, so that the animation character has stable adsorption point locations regardless of in which animation posture the animation character is, thereby ensuring that there are always effective adsorption points for the triggering point to automatically adsorb, avoiding that the automatic adsorption becomes ineffective, to ensure reliability and accuracy of target positioning.

In an exemplary embodiment, before step 350, the foregoing method may further include the following steps:

determining whether a distance between the location of the triggering point and any adsorption point location is less than a preset distance; and if yes, determining that the location of the triggering point is in an adsorption range determined by any adsorption point location.

As stated above, the adsorption range is a range defined by using the adsorption point locations as a circle center and a preset distance as a radius.

The preset distance may be flexibly adjusted according to an actual application scenario and is not limited herein.

Figure 7:
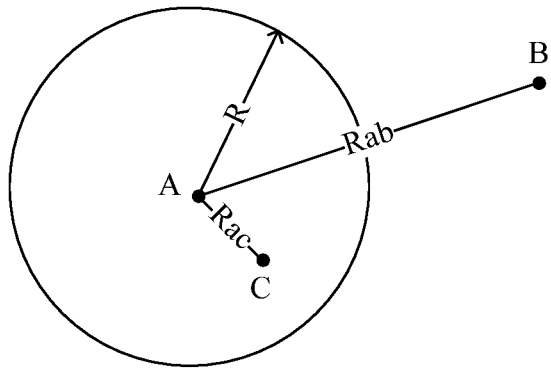
FIG. 7 is a schematic diagram of an adsorption range determined by an adsorption point location in the present disclosure.

Therefore, as shown in FIG. 7, assuming that an adsorption point location at which any adsorption point is located is A, and the preset distance is R, a range shown by a circle in FIG. 7 is an adsorption range determined by the adsorption point location A.

It is assumed that the location of the triggering point is B, and a distance between the location B of the triggering point and the adsorption point location A is $R_{ab}$. Because $R_{ab} > R$, indicating that the distance between the location B of the triggering point and the adsorption point location A is greater than the preset distance, it is determined that the location B of the triggering point is not in the adsorption range determined by the adsorption point location A. In this case, the automatic adsorption does not come into effect, and adsorption point weight value computing is not performed, and step 310 is returned to.

It is assumed that the location of the triggering point is C, and a distance between the location C of the triggering point and the adsorption point location A is $R_{ac}$. Because $R_{ac} < R$, indicating that the distance between the location C of the triggering point and the adsorption point location A is less than the preset distance, it is determined that the location C of the triggering point is in the adsorption range determined by the adsorption point location A. In this case, the automatic adsorption comes into effect, and adsorption point weight value computing is performed, and step 350 is performed.

Under action of the foregoing embodiments, the size of the adsorption range may be flexibly adjusted through the setting of the preset distance, to set different adsorption ranges for different virtual targets. For example, in a shooting game scene, a small adsorption range may be set for a boss-level animation character, to increase complexity of aiming of the virtual target, thereby further effectively enhancing flexibility of target positioning.

Figure 8:
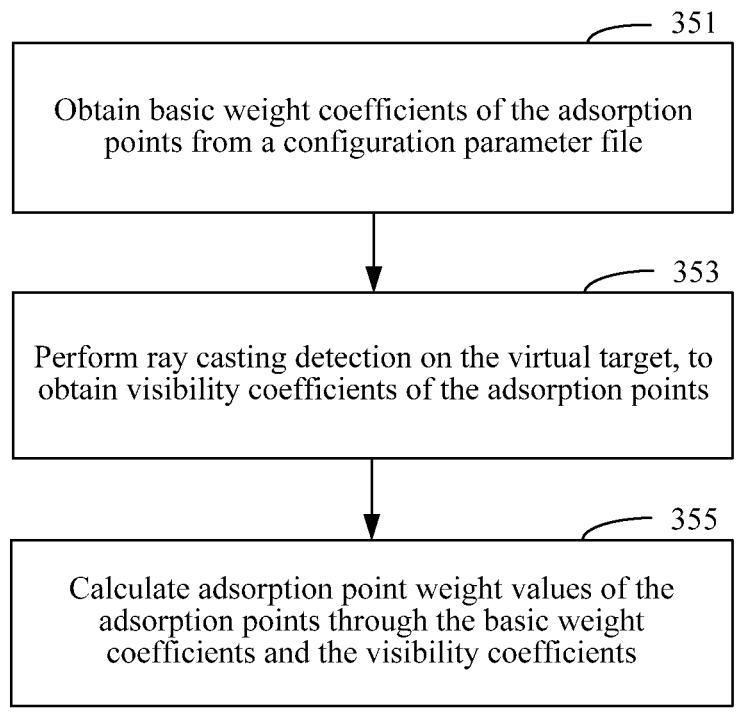
FIG. 8 is a flowchart of step 350 in an embodiment corresponding to FIG. 3 in an embodiment.

Referring to FIG. 8, in an exemplary embodiment, step 350 may include the following steps:

Step 351: Obtain basic weight coefficients of the adsorption points from a configuration parameter file.

The basic weight coefficients are related to the adsorption point locations at which the adsorption points are located, that is, different adsorption point locations indicate different basic weight coefficients, to represent priorities of adsorption points at different locations in the virtual target.

When the virtual target is an animation character, as shown in FIG. 4, an adsorption point location is on a head, and a basic weight coefficient is 3; an adsorption point location is on a body, and a basic weight coefficient is 4, indicating that a priority of an adsorption point on the body of the virtual target is higher than a priority of an adsorption point on a head of the virtual target.

The basic weight coefficients are predefined and recorded in the configuration parameter file. In addition, the basic weight coefficients may be flexibly adjusted according to an actual application scenario. For example, in a shooting game scene, assuming that user tends to aim the head of the virtual target, a basic weight coefficient of an adsorption point located on the head may be adjusted as 5, to satisfy a user requirement, to improve aiming and shooting experience of the user.

The basic weight coefficients in the configuration parameter file may be defined by the user, or defined by a developer. This is not limited herein.

Based on the above, the basic weight coefficients of the adsorption points can be obtained from the configuration parameter file.

Step 353: Perform ray casting detection on the virtual target, to obtain visibility coefficients of the adsorption points.

It may be understood that the virtual target is hidden behind a shelter, and some or even all of adsorption points set on the virtual target may also be blocked by the shelter.

Therefore, the visibility coefficient is used for indicating whether the adsorption points are blocked by the shelter. For example, the visibility coefficient is 0, indicating that the adsorption points are blocked by the shelter. On the contrary, the visibility coefficient is 1, indicating that the adsorption point is not blocked by the shelter.

In this embodiment, the visibility coefficient is obtained by performing ray casting detection on the virtual target. The ray casting detection means that a ray is projected from the outside of the virtual target to the virtual target. If the ray can penetrate the virtual target from the outside of the virtual target, the virtual target is considered to be visible.

For example, the ray casting detection may be performed through a detection function preset in the electronic device. For example, a ray casting detection result returned by a Raycast function is the visibility coefficient.

Step 355: Calculate adsorption point weight values of the adsorption points through the basic weight coefficients and the visibility coefficients.

Specifically, a calculation formula for the adsorption point weight value is as follows:

$$W_{point} = \omega_{base} \times R_{hit}.$$

$W_{point}$ represents an adsorption point weight value of any adsorption point on the virtual target. $\omega_{base}$ represents a basic weight coefficient of the adsorption point. $R_{hit}$ represents a visibility coefficient of the adsorption point.

In the foregoing process, the adsorption point weight values respectively corresponding to the adsorption points set on the virtual target can be obtained, to provide sufficient evidence for movement of the triggering point.

In an exemplary embodiment, the foregoing method may further include the following steps:

configuring firearm weight coefficients for a plurality of firearm types and associatively storing the plurality of firearm types and the firearm weight coefficients of the firearm types in the configuration parameter file.

Figure 9:
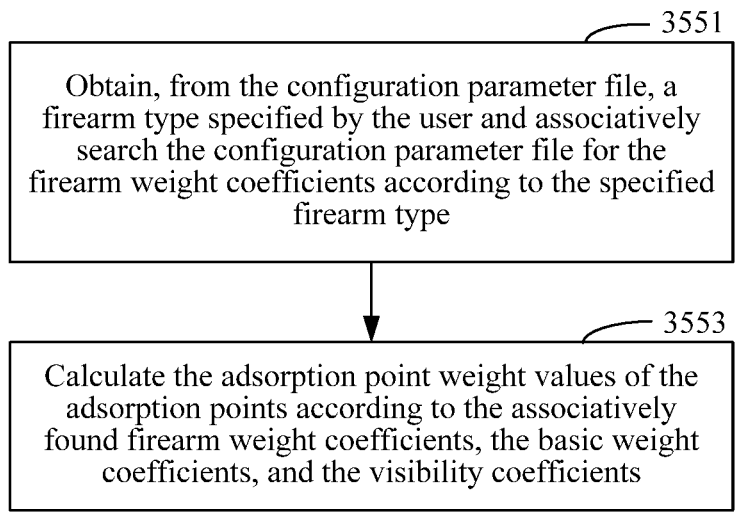
FIG. 9 is a flowchart of step 355 in an embodiment corresponding to FIG. 8 in an embodiment.

Correspondingly, referring to FIG. 9, step 355 may include the following step:

Step 3551: Obtain, from the configuration parameter file, a firearm type specified by the user and associatively search the configuration parameter file for the firearm weight coefficients according to the specified firearm type.

As stated above, after the firearm weight coefficients are respectively set for the firearm types, the firearm types and the firearm weight coefficients of the firearm types are associatively stored in the configuration parameter file.

Hence, after the firearm type specified by the user is obtained from the configuration parameter file, a firearm weight coefficient corresponding to the specified firearm type may be further obtained through the associatively stored firearm types and firearm weight coefficients of the firearm types in the configuration parameter file.

Step 3553: Calculate the adsorption point weight values of the adsorption points according to the associatively found firearm weight coefficients, the basic weight coefficients, and the visibility coefficients.

Specifically, a calculation formula for the adsorption point weight value is as follows:

$$W_{point} = \omega_{base} \times \mu_{weapon} \times R_{hit}.$$

$W_{point}$ represents an adsorption point weight value of any adsorption point on the virtual target. $\omega_{base}$ represents a basic weight coefficient of the adsorption point. $\mu_{weapon}$ represents a firearm weight coefficient corresponding to the firearm type specified by the user. $R_{hit}$ represents a visibility coefficient of the adsorption point.

In the forgoing process, the adsorption point weight values of the adsorption points are related to the firearm type specified by the user. That is, the firearm type specified by the user changes. Therefore, the adsorption point weight values of the adsorption points correspondingly change, thereby further enhancing flexibility of target positioning.

Figure 10:
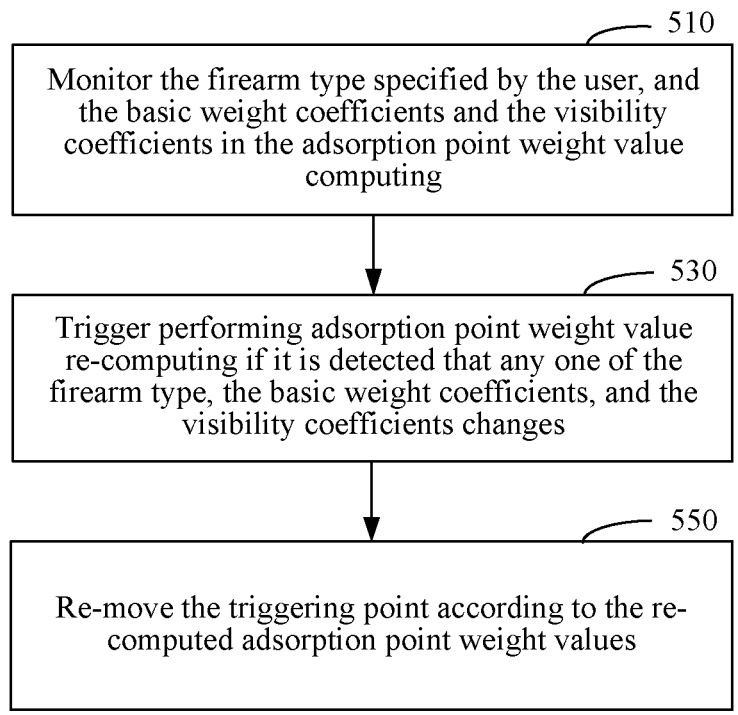
FIG. 10 is a flowchart of another target positioning method in a virtual interactive scene according to an exemplary embodiment.

Referring to FIG. 10, in an exemplary embodiment, after step 370, the foregoing method may further include the following steps:

Step 510: Monitor the firearm type specified by the user, and the basic weight coefficients and the visibility coefficients in the adsorption point weight value computing.

Step 530: Trigger performing adsorption point weight value re-computing if it is detected that any one of the firearm type, the basic weight coefficients, and the visibility coefficients changes.

Step 550: Re-move the triggering point according to the re-computed adsorption point weight values.

It is to be understood that for the user, different basic weight coefficients may be re-defined, different firearm types may be re-selected, or different user-controlled objects may be re-selected, and different firearm types may be re-selected in a re-selection process, so that the firearm weight coefficient accordingly changes. For the virtual target, the virtual target may be circularly hidden from or exposed to the shelter to avoid being aimed, so that the visibility coefficient correspondingly changes.

Therefore, any one of the firearm weight coefficient, the basic weight coefficient, and the visibility coefficient is monitored, if it is detected that any one of the firearm weight coefficient, the basic weight coefficient, and the visibility coefficient changes, the adsorption point weight value is re-calculated, so that the automatic adsorption of the triggering point is re-performed, that is, the triggering point moves to a location at which an adsorption point corresponding to the re-calculated largest adsorption point weight value is located.

Under action of the foregoing embodiments, dynamic change of the adsorption point weight value is achieved, so that movement of the triggering point also dynamically changes. That is, the triggering point can be always automatically adsorbed to an adsorption point set on the virtual target, thereby fully ensuring effectiveness and flexibility of the target positioning, thereby further ensuring accuracy of target positioning.

In an exemplary embodiment, the triggering point is automatically adsorbed at an adsorption angular velocity.

Correspondingly, before step 370, the foregoing method may further include the following step:

performing adsorption angular velocity computing according to a relative displacement between the user-controlled object and the virtual target in a horizontal direction.

Figure 11:
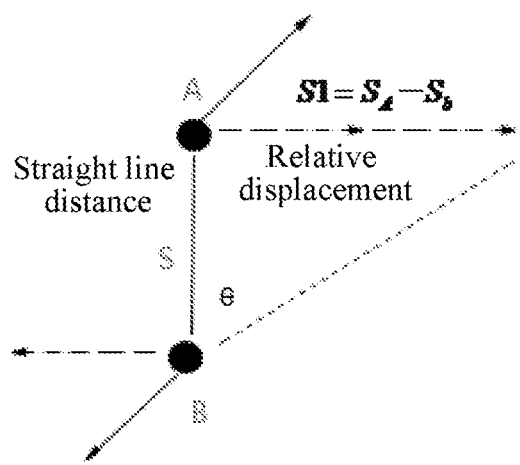
FIG. 11 is a schematic diagram of a relative displacement between a user-controlled object and a virtual target in the present disclosure.

Specifically, as shown in FIG. 11, it is assumed that the user-controlled object is located at a point A, and the virtual target is located at a point B.

In this case, the user-controlled object and the virtual target move to opposite inclined rear directions. Therefore, a relative displacement S1, that is, $S1 = S_A - S_b$, in the horizontal direction is generated. $S_A$ represents a displacement for which the user-controlled object moves along the horizontal direction, and $S_B$ indicates a displacement for which the virtual target moves along the horizontal direction.

After the relative displacement S1 in the horizontal direction is generated, an adsorption angular velocity $\omega$ may be calculated.

A calculation formula for the adsorption angular velocity $\omega$ is as follows:

$$\arctan \theta = \frac{S1}{S}. \quad (1)$$

$$\omega = \frac{\arctan \theta}{t}. \quad (2)$$

S represents a straight line distance between the user-controlled object and the virtual target, and t represents a time used by generation of the relative displacement.

That is, a tangent value of a θ angle is first calculated according to the relative displacement S1 and the straight line distance S in the calculation formula (1), and then the adsorption angular velocity $\omega$ is obtained, according to a calculation formula (2), by calculating the tangent value of the θ angle and the time t used by the relative displacement.

The time t used by the relative displacement may be obtained by a timer.

In the foregoing process, the relative displacement S1 is introduced in a calculation process of the adsorption angular velocity, to partially offset change generated by the straight line distance S between the user-controlled object and the virtual target, to resolve a problem that the adsorption angular velocity is not sufficiently stable in automatic aiming.

Further, as stated above, if the calculation formula (1) and the calculation formula (2) are combined, the calculation formula for the adsorption angular velocity $\omega$ may be simplified as $$\omega = \frac{V_a - V_b}{S},$$

that is, the time t used by the relative displacement does not affect the adsorption angular velocity $\omega$. The adsorption angular velocity $\omega$ is mainly decided by the straight line distance S and the relative movement velocity $V_{ab}$.

The relative movement velocity $V_{ab}$, that is, $V_a - V_b$, $V_a$, represents a velocity vector of the user-controlled object in the horizontal direction, and $V_b$ represents a velocity vector of the virtual target in the horizontal direction.

In other words, the adsorption angular velocity is actually related to a relative movement velocity between the user-controlled object and the virtual target in the horizontal direction in addition to the straight line distance between the user-controlled object and the virtual target.

Figure 12:
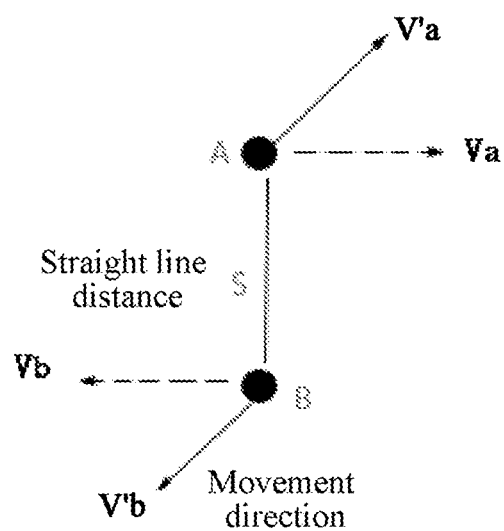
FIG. 12 is a schematic diagram of a relative movement velocity in the present disclosure.

As shown in FIG. 12, in a process in which the user-controlled object and the virtual target both move to opposite inclined rear directions, the user-controlled object and the virtual target respectively have a movement velocity $V'_a$ and a movement velocity $V'_b$, to decompose velocity vectors $V_a$ and $V_b$ in the horizontal direction, to obtain the relative movement velocity $V_{ab} = V_a - V_b$.

Based on the above, the adsorption angular velocity $\omega$ may be obtained.

The movement velocity stored in the configuration parameter file is a scalar value and is assigned with a movement direction only in an actual movement process, to be represented in a vector form.

Further, it is to be understood that the movement velocity of the user-controlled object and the movement velocity of the virtual target are usually the same, to ensure that the user-controlled object can catch up with the virtual target.

Based on the above, assuming that the user-controlled object and the virtual target move to the same direction in the horizontal direction, the relative movement velocity between the user-controlled object and the virtual target is 0. Correspondingly, the adsorption angular velocity is 0, causing failure of automatic adsorption of the triggering point.

For this, in this embodiment, the relative movement velocity is further expanded, avoiding a situation in which the adsorption angular velocity is 0.

That is, the velocity difference and a maximum value of the velocity vector of the virtual target in the horizontal direction are used as the relative movement velocity. The velocity difference is calculated according to the velocity vectors of the user-controlled object and the virtual target in the horizontal direction.

Specifically, $V_{ab} = \max\{V_b, V_a - V_b\}$. In this case, if $V_a - V_b$ is 0, that is, the user-controlled object and the virtual target move to the same direction at the same movement velocity in the horizontal direction, and the relative movement velocity is the velocity vector $V_b$ of the virtual target in the horizontal direction. On the contract, if $V_a - V_b$ is not 0, that is, the user-controlled object and the virtual target move to opposite directions at the same movement velocity in the horizontal direction, and the relative movement velocity is a velocity difference $V_a - V_b$.

In the foregoing process, a situation in which the adsorption angular velocity is 0 is effectively avoided, thereby ensuring effectiveness of the adsorption angular velocity, and fully improving a success rate of the automatic adsorption, so that the triggering point can be certainly automatically adsorbed to the adsorption points set by the virtual target.

Further, it may be understood that when the user wants to separate the triggering point from the adsorption range to separate from the virtual target, a triggering operation that is opposite when target positioning is performed is performed. For example, the user performs target positioning by controlling the mouse to approach the virtual target displayed in the screen. On the contrary, the user separates the triggering point by controlling the mouse to get away from the virtual target displayed in the screen.

However, when the adsorption angular velocity is large, the user needs to control an input apparatus at a speed faster than that when the adsorption angular velocity is small. Otherwise, it is difficult for the triggering point to be separated from the virtual target, causing large costs for the triggering point to be currently separated from the virtual target.

For this, in this embodiment, costs for the triggering point to be separated from the virtual target are lowered by a setting of an adsorption coefficient.

The adsorption coefficient reflects a difficulty degree for the triggering point to be separated from the virtual target. A smaller adsorption coefficient indicates that the triggering point is more easily separated from the virtual target.

The adsorption coefficient is a variable value and is related to a user input velocity. That is, a faster user input velocity indicates that the user wants to separate the triggering point from the virtual target. Therefore, a smaller adsorption coefficient indicates that the triggering point is more easily separated from the virtual target, thereby ensuring that a game hand feeling and experience further meet user's habits.

The user input velocity may be a user screen sliding velocity, a user joystick using velocity, a user mouse sliding velocity, a user key pressing velocity, or the like and is not described one by one herein.

Using the user screen sliding velocity as an example, the user screen sliding velocity is a velocity at which the user slides the screen through a finger, a mouse, or a stylus. The speed is measured by a distance per unit time for which the finger, the mouse, the stylus slides.

Figure 13:
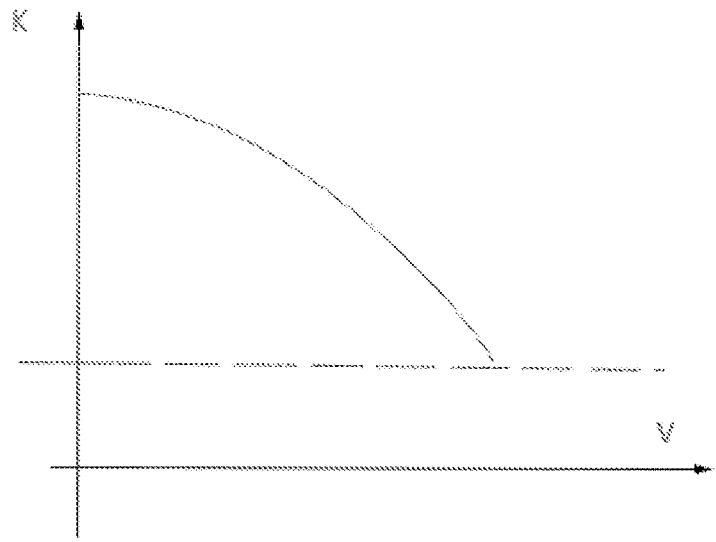
FIG. 13 is a schematic diagram of a conversion relationship between an adsorption coefficient and a user screen sliding velocity in the present disclosure.

Using an adsorption coefficient K as a y coordinate and using a user screen sliding velocity V as an x coordinate, a corresponding curve function is obtained by establishing a conversion relationship between the adsorption coefficient K and the user screen sliding velocity V, as shown in FIG. 13.

In the conversion relationship, the adsorption coefficient k progressively decreases as the user screen sliding velocity V increases. When the user screen sliding velocity increases to a degree, the adsorption coefficient decreases to a fixed minimum value, and when the user screen sliding velocity continues increasing, the adsorption coefficient is always kept at the minimum value and does not change.

In the process, the adsorption coefficient does not decrease to 0 forever, to ensure that the adsorption angular velocity always exists and does not disappear because the user screen sliding velocity is excessively fast.

Specifically, the user screen sliding velocity is calculated by intercepting the triggering operation for separating the triggering point from the virtual target by the user.

The triggering operation for separating the triggering point from the virtual target by the user is continuously intercepted, to determine at least two locations, that is, a current location and a previous current location, of the triggering point in the screen, calculate a sliding distance of the finger, the mouse, or the stylus according to the current location and the previous current location of the triggering point in the screen and calculate a sliding distance of the sliding distance according to a timestamp corresponding to continuous interception, to obtain the user screen sliding velocity.

The user screen sliding velocity is converted into a corresponding adsorption coefficient according to a conversion relationship between the adsorption coefficient and the user screen sliding velocity.

The adsorption angular velocity is calculated according to the adsorption coefficient obtained through conversion, the relative movement velocity, and the straight line distance. That is, a calculation formula for the adsorption angular velocity $\omega$ is $$\omega = K \times \frac{V_{ab}}{S}.$$

In the foregoing process, when the user softly slides the screen, it can still be ensured that the user has a large adsorption angular velocity on the virtual target. However, when the user quickly slides the screen, it is regarded that the user makes the triggering point have a desire of being separated from the virtual target. Therefore, the adsorption angular velocity is reduced under action of the adsorption coefficient, so that the triggering point is more easily separated from the virtual target, to well meet a user requirement.

In an exemplary embodiment, the foregoing method may further include the following steps:

monitoring the user screen sliding velocity;

triggering performing adsorption angular velocity re-computing if it is detected that the user screen sliding velocity changes; and moving the triggering point according to the re-computed adsorption angular velocity.

As stated above, the user screen sliding velocity is related to the adsorption coefficient.

Therefore, if it is detected that the user screen sliding velocity changes, it can be regarded according to the conversion relationship between the user screen sliding velocity and the adsorption coefficient stored in the configuration parameter file that the adsorption coefficient accordingly changes, so that the adsorption angular velocity correspondingly changes. In this case, the triggering point moves to the adsorption point location according to the adsorption angular velocity that changes.

Under action of the foregoing embodiments, dynamic change of the adsorption angular velocity is achieved, that is, the triggering point can be always automatically adsorbed to the adsorption points set by the virtual target at a speed, thereby fully ensuring effectiveness of the automatic adsorption, further ensuring hitting accuracy of the virtual target.

The following describes apparatus embodiments of the present disclosure, which may be used for performing the target positioning method in a virtual interactive scene in the present disclosure. For details not disclosed in the apparatus embodiments of the present disclosure, refer to the embodiments of the target positioning method in a virtual interactive scene in the present disclosure.

Figure 14:
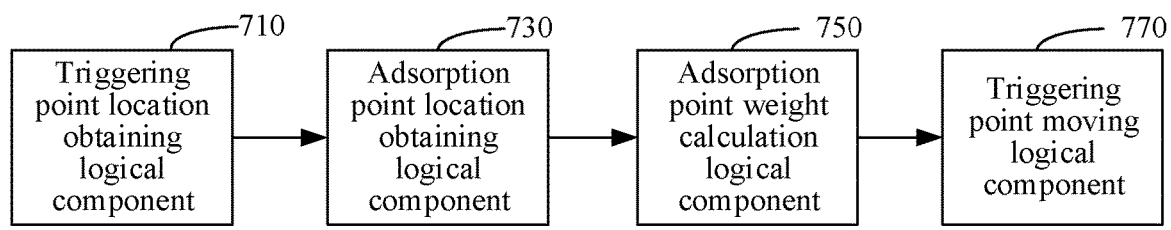
FIG. 14 is a block diagram of a target positioning apparatus in a virtual interactive scene according to an exemplary embodiment.

Referring to FIG. 14, in an exemplary embodiment, a target positioning apparatus 700 in a virtual interactive scene includes, but is not limited to: a triggering point location obtaining logical component 710, an adsorption point location obtaining logical component 730, an adsorption point weight calculation logical component 750, and a triggering point moving logical component 770.

The triggering point location obtaining logical component 710 is configured to intercept a triggering operation for performing target positioning by a user and obtain a location of a triggering point in a screen.

The adsorption point location obtaining logical component 730 is configured to determine and obtain a plurality of adsorption point locations according to the location of the triggering point and a plurality of adsorption points on a virtual target. Each adsorption point location corresponds to an adsorption point.

The adsorption point weight calculation logical component 750 is configured to perform, in a case that the location of the triggering point is in an adsorption range determined by any adsorption point location, adsorption point weight value computing on the plurality of adsorption points, to obtain a plurality of adsorption point weight values corresponding to the adsorption points.

The triggering point moving logical component 770 is configured to move the triggering point to an adsorption point location at which an adsorption point corresponding to a largest adsorption point weight value is located.

Figure 15:
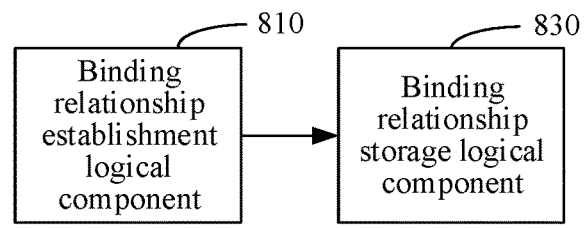
FIG. 15 is a block diagram of another target positioning apparatus in a virtual interactive scene according to an exemplary embodiment.

Referring to FIG. 15, in an exemplary embodiment, the virtual target is an animation character and is represented by a plurality of animation skeleton points.

Correspondingly, the apparatus 700 further includes, but is not limited to: a binding relationship establishment logical component 810 and a binding relationship storage logical component 830.

The binding relationship establishment logical component 810 is configured to select a plurality of animation skeleton points from the virtual target and establish a one-to-one-correspondence binding relationship between the selected animation skeleton points and the adsorption points.

The binding relationship storage logical component 830 is configured to store the binding relationship in a configuration parameter file, the configuration parameter file being used for determining the adsorption point locations.

Figure 16:
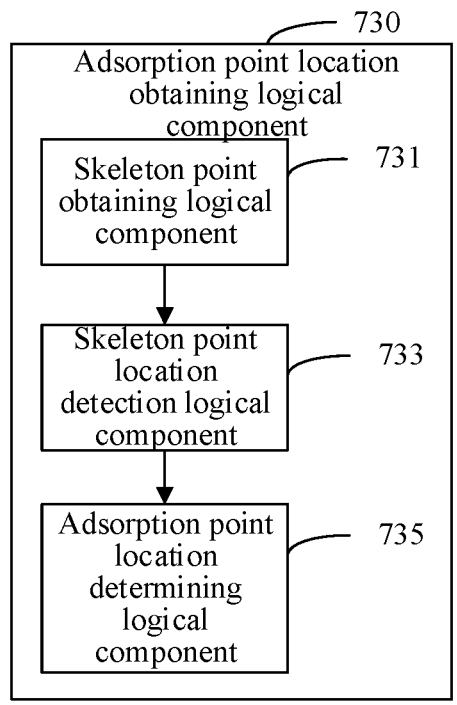
FIG. 16 is a block diagram of an adsorption point location obtaining logical component 730 in an embodiment corresponding to FIG. 14 in an embodiment.

Referring to FIG. 16, in an exemplary embodiment, the adsorption point location obtaining logical component 730 includes, but is not limited to: a skeleton point obtaining logical component 731, a skeleton point location detection logical component 733, and an adsorption point location determining logical component 735.

The skeleton point obtaining logical component 731 is configured to obtain, from the configuration parameter file, the animation skeleton points that have the binding relationship with the adsorption points.

The skeleton point location detection logical component 733 is configured to detect locations of the animation skeleton points in the screen.

The adsorption point location determining logical component 735 is configured to use the locations of the animation skeleton points in the screen as the adsorption point locations corresponding to the adsorption points.

In an exemplary embodiment, the apparatus 700 further includes, but not limited to: a distance determining logical component.

The distance determining logical component is configured to notify the adsorption point weight calculation logical component 750 in a case that a distance between the location of the triggering point and the any adsorption point location is less than a preset distance.

Figure 17:
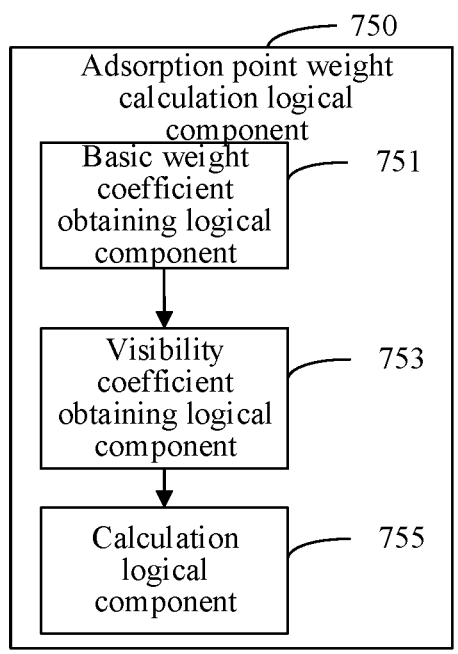
FIG. 17 is a block diagram of an adsorption point weight value calculation logical component 750 in an embodiment corresponding to FIG. 14 in an embodiment.

Referring to FIG. 17, in an exemplary embodiment, the adsorption point weight calculation logical component 750 includes, but not limited to: a basic weight coefficient obtaining logical component 751, a visibility coefficient obtaining logical component 753, and a calculation logical component 755.

The basic weight coefficient obtaining logical component 751 is configured to obtain basic weight coefficients of the adsorption points from a configuration parameter file.

The visibility coefficient obtaining logical component 753 is configured to perform ray casting detection on the virtual target, to obtain visibility coefficients of the adsorption points.

The calculation logical component 755 is configured to calculate adsorption point weight values of the adsorption points through the basic weight coefficients and the visibility coefficients.

In an exemplary embodiment, the apparatus 700 further includes, but not limited to: a firearm weight coefficient configuration logical component.

The firearm weight coefficient configuration logical component is configured to configure firearm weight coefficients for a plurality of firearm types and associatively store the plurality of firearm types and the firearm weight coefficients of the firearm types in the configuration parameter file.

Figure 18:
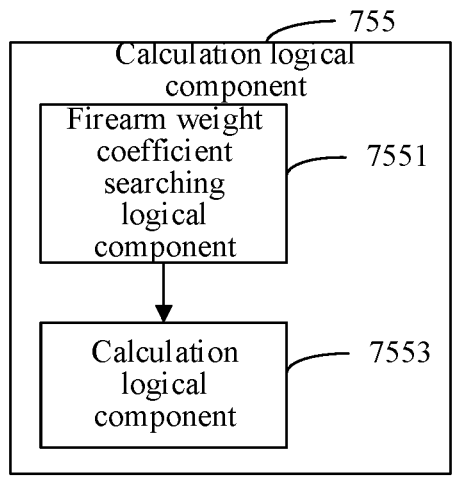
FIG. 18 is a block diagram of a calculation logical component 755 in an embodiment corresponding to FIG. 17 in an embodiment.

Correspondingly, referring to FIG. 18, the calculation logical component 755 includes, but not limited to: a firearm weight coefficient searching logical component 7551 and a calculation logical component 7553.

The firearm weight coefficient searching logical component 7551 is configured to obtain, from the configuration parameter file, a firearm type specified by the user and associatively search the configuration parameter file for the firearm weight coefficients according to the specified firearm type.

The calculation logical component 7553 is configured to calculate the adsorption point weight values of the adsorption points according to the associatively found firearm weight coefficients, the basic weight coefficients, and the visibility coefficients.

Figure 19:
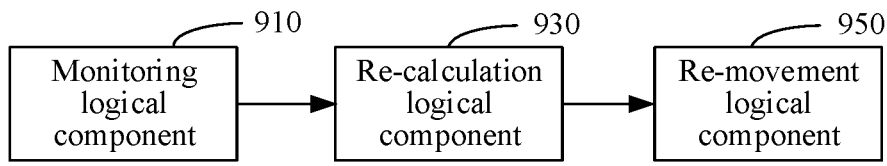
FIG. 19 is a block diagram of another target positioning apparatus in a virtual interactive scene according to an exemplary embodiment.

Referring to FIG. 19, in an exemplary embodiment, the apparatus 700 further includes, but is not limited to: a monitoring logical component 910, a re-calculation logical component 930, and a re-movement logical component 950.

The monitoring logical component 910 is configured to monitor the firearm type specified by the user, and the basic weight coefficients and the visibility coefficients in the adsorption point weight value computing.

The re-calculation logical component 930 is configured to trigger performing adsorption point weight value re-computing if it is detected that any one of the firearm type, the basic weight coefficients, and the visibility coefficients changes.

The re-movement logical component 950 is configured to re-move the triggering point according to the re-computed adsorption point weight values.

When the target positioning apparatus in a virtual interactive scene provided in the foregoing embodiment performs target positioning processing in the virtual interactive scene, only division of the foregoing functional logical components is used as an example for description. In actual application, the foregoing functions may be allocated to and completed by different functional logical components according to requirements, that is, an internal structure of the target positioning apparatus in a virtual interactive scene is divided into different functional logical components, to complete all or some of the foregoing described functions.

In addition, the target positioning apparatus in a virtual interactive scene provided in the foregoing embodiment and the embodiment of the target positioning method in a virtual interactive scene belong to the same idea, and specific manners for the logical components to execute operations are described in detail in the method embodiments and are not described in detail herein.

Figure 20:
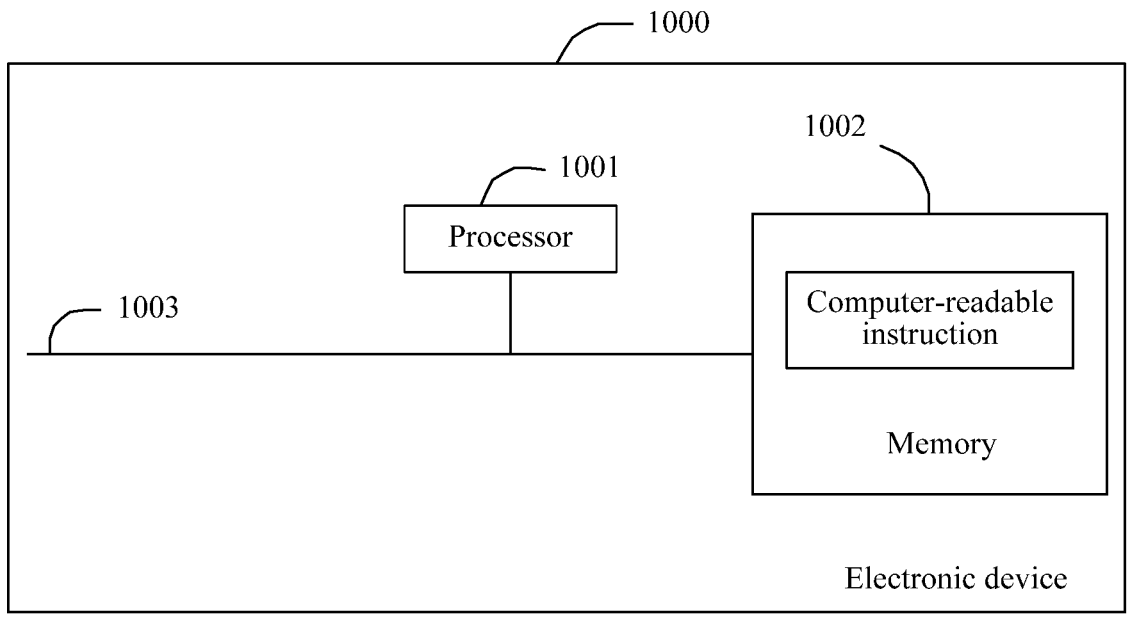
FIG. 20 is a schematic diagram of another hardware structure of an electronic device according to an exemplary embodiment.

Referring to FIG. 20, in an exemplary embodiment, an electronic device 1000 includes, but is not limited to: a processor 1001, a memory 1002, and a communications bus 1003.

A computer-readable instruction is stored in the memory 1002. The processor 1001 reads, through the communications bus 1003, the computer-readable instruction stored in the memory 1002.

Execution of the computer-readable instruction by the processor 1001 causes the processor 1001 to implement the target positioning method in a virtual interactive scene in the foregoing embodiments.

In an exemplary embodiment, a computer storage medium stores a computer program, execution of the computer program by a processor causing the processor to implement the target positioning method in a virtual interactive scene in the foregoing embodiments.

The logical components described herein may be hardware or a combination of hardware and software. For example, each logical component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each logical component may include memory hardware, such as a portion of the memory, for example, that comprises instructions executable with the processor or other processors to implement one or more of the features of the logical components. When any one of the logical components includes the portion of the memory that comprises instructions executable with the processor, the logical component may or may not include the processor. In some examples, each logical components may just be the portion of the memory or other physical memory that comprises instructions executable with the processor or other processor to implement the features of the corresponding logical component without the logical component including any other hardware. Because each logical component includes at least some hardware even when the included hardware comprises software, each logical component may be interchangeably referred to as a hardware logical component.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A method for target positioning, comprising:

intercepting, by a processor of an electronic device, a triggering operation for target positioning in a virtual interactive scene generated on a screen of the electronic device, the triggering operation performed by an input apparatus of the electronic device controlled by a user, the triggering operation causing the processor to display a triggering point on the screen, the triggering point indicating a location in the virtual interactive scene where the input apparatus is pointing;

obtaining, by the processor, the location of the triggering point on the screen;

determining, by the processor, a plurality of adsorption point locations based on the location of the triggering point and a plurality of adsorption points on a virtual target in the virtual interactive scene generated on the screen, the adsorption point locations respectively associated with the adsorption points;

generating, by the processor, in response to the location of the triggering point being within an adsorption range of at least one of the adsorption point locations, a plurality of adsorption point weight values corresponding to the adsorption points; and adjusting, by the processor, the triggering point on the screen from the location where the input apparatus is pointing to an adsorption point location at which an adsorption point on the virtual object corresponding to a largest adsorption point weight value is located.

2. The method of claim 1, wherein the virtual target is an animation character and is represented by a plurality of animation skeleton points, wherein before determining the plurality of adsorption point locations based on the location of the triggering point and the plurality of adsorption points on a virtual target, the method further comprises:

selecting the animation skeleton points from the virtual target and establishing a one-to-one-correspondence binding relationship between the selected animation skeleton points and the adsorption points; and storing the binding relationship in a configuration parameter file, the configuration parameter file being accessed to determine the adsorption point locations.

3. The method of claim 2, wherein determining the plurality of adsorption point locations based on the location of the triggering point and the plurality of adsorption points on a virtual target further comprises:
obtaining, from the configuration parameter file, the animation skeleton points that have the binding relationship with the adsorption points;
detecting locations of the animation skeleton points on the screen; and
wherein, the adsorption point locations comprise the locations of the animation skeleton points on the screen.

4. The method of claim 1, further comprising:
determining the location of the triggering point is within the adsorption range in response to a distance between the location of the triggering point and the at least one of the adsorption point locations being less than a preset distance.

5. The method of claim 1, wherein generating, in response to the location of the triggering point being within an adsorption range of at least one of the adsorption point locations, a plurality of adsorption point weight values corresponding to the adsorption points further comprises:
obtaining basic weight coefficients of the adsorption points from a configuration parameter file;
obtaining visibility coefficients of the adsorption points based on ray casting detection on the virtual target; and
determining adsorption point weight values of the adsorption points based on the basic weight coefficients and the visibility coefficients.

6. The method of claim 5, further comprising:
configuring firearm weight coefficients for a plurality of firearm types and associatively storing the plurality of firearm types and the firearm weight coefficients of the firearm types in the configuration parameter file,
wherein determining adsorption point weight values of the adsorption points based on the basic weight coefficients and the visibility coefficients further comprises:
obtaining, from the configuration parameter file, a specified firearm type;
identifying, in the configuration parameter file, the firearm weight coefficients associated with the specified firearm type; and
calculating the adsorption point weight values of the adsorption points based the identified firearm weight coefficients, the basic weight coefficients, and the visibility coefficients.

7. The method of claim 6, wherein after adjusting the triggering point to the adsorption point location at which the adsorption point corresponding to the largest adsorption point weight value is located, the method further comprises:
monitoring the specified firearm type, the basic weight coefficients, and the visibility coefficients;
recalculating the adsorption point weights in response a change in the specified firearm type, the basic weight coefficients, and the visibility coefficients, or any combination thereof; and
re-adjusting the triggering point based on the recalculated adsorption point weight values.

8. The method of claim 1, wherein before adjusting the triggering point to the adsorption point location at which the adsorption point corresponding to the largest adsorption point weight value is located, the method further comprises:
determining a relative displacement between the virtual target and a user-controlled object in a horizontal direction; and
calculating an adsorption angular velocity according to the relative displacement, wherein adjustment of the triggering point is based on the adsorption angular velocity.

9. The method of claim 8, wherein generating, in response to the location of the triggering point being within the adsorption range of at least one of the adsorption point locations, the plurality of adsorption point weight values corresponding to the adsorption points further comprises:
obtaining movement velocities of the user-controlled object and the virtual target;
decomposing the movement velocities of the user-controlled object and the virtual target into velocity vectors in the horizontal direction based on a movement direction in response to the user-controlled object and the virtual target being displaced along the horizontal direction;
determining a relative movement velocity based on the velocity vectors of the user-controlled object and the virtual target in the horizontal direction;
detecting locations of the user-controlled object and the virtual target in the screen and calculating a straight line distance between the user-controlled object and the virtual target according to the locations of the user-controlled object and the virtual target; and
calculating the adsorption angular velocity based on the relative movement velocity and the straight line distance.

10. The method of claim 9, wherein determining the relative movement velocity based on the velocity vectors of the user-controlled object and the virtual target in the horizontal direction further comprises:
calculating a velocity difference according to the velocity vectors of the user-controlled object and the virtual target in the horizontal direction; and
generating the relative movement velocity based the calculated velocity difference and a peak value of the velocity vector of the virtual target in the horizontal direction.

11. The method of claim 9, wherein calculating the adsorption angular velocity based on the relative movement velocity and the straight line distance further comprises:
calculating a input velocity in response to detection of a triggering operation for separating the triggering point from the virtual target;
converting the input velocity into a adsorption coefficient based on a conversion relationship between the adsorption coefficient and the input velocity; and
calculating the adsorption angular velocity based on the adsorption coefficient obtained through conversion, the relative movement velocity, and the straight line distance.

12. The method of claim 11, wherein before adjusting the triggering point to the adsorption point location at which the adsorption point corresponding to the largest adsorption point weight value is located, the method further comprises:
monitoring the input velocity; and
recalculating the adsorption angular velocity in response to detection of a change in the input velocity.

13. The method of claim 1, wherein the virtual interactive scene comprises a shooting game scene, and the virtual target comprises a virtual object that is aimed for targeting in the shooting game scene.

14. A device, comprising:
a processor, the processor configured to:
intercept a triggering operation for target positioning in a virtual interactive scene generated on a screen of the device, the triggering operation performed by an input apparatus of the device controlled by a user, the triggering operation causing the processor to display a triggering point on the screen, the triggering point indicating a location in the virtual interactive scene where the input apparatus is pointing;
obtain the location of the triggering point on the screen;
determine a plurality of adsorption point locations based on the location of the triggering point and a plurality of adsorption points on a virtual target in the virtual interactive scene generated on the screen, the adsorption point locations respectively associated with the adsorption points;
generate, in response to the location of the triggering point being within an adsorption range of at least one of the adsorption point locations, a plurality of adsorption point weight values corresponding to the adsorption points; and
adjust the triggering point on the screen from the location where the input apparatus is pointing to an adsorption point location at which an adsorption point on the virtual object corresponding to a largest adsorption point weight value is located.

15. The device of claim 14, wherein the virtual target comprises an animation character, wherein the animation character is represented by a plurality of animation skeleton points, wherein the processor is further configured to:
select a plurality of animation skeleton points from the virtual target and establish one-to-one-correspondence binding relationships between the selected animation skeleton points and the adsorption points, respectively; and
store the binding relationship in a configuration parameter file, the configuration parameter file being accessed to determine the adsorption point locations;
obtain, from the configuration parameter file, the animation skeleton points in response to the animation skeleton points being associated with the adsorption points based on the binding relationships;
detect locations of the animation skeleton points in the screen; and
set the locations of the animation skeleton points to the screen as the adsorption point locations corresponding to the adsorption points.

16. The device of claim 14, wherein the processor is further configured to:
determine the location of the triggering point being within an adsorption range of at least one of the adsorption point locations based on a determination that a distance between the location of the triggering point and the at least one of the adsorption point location is less than a preset distance.

17. The device of claim 14, wherein the processor is further configured to:
obtain basic weight coefficients of the adsorption points from a configuration parameter file;
execute ray casting detection on the virtual target to obtain visibility coefficients of the adsorption points; and
calculate adsorption point weight values of the adsorption points based on the basic weight coefficients and the visibility coefficients;
configure firearm weight coefficients for a plurality of firearm types and associatively store the plurality of firearm types and the firearm weight coefficients of the firearm types in the configuration parameter file; and
obtain, from the configuration parameter file, a firearm type specified by the user and associatively search the configuration parameter file for the firearm weight coefficients according to the specified firearm type; and
calculate the adsorption point weight values of the adsorption points according to the associatively found firearm weight coefficients, the basic weight coefficients, and the visibility coefficients.

18. The device of claim 17, wherein the processor is further configured to:
monitor the specified firearm type, the basic weight coefficients, and the visibility coefficients in the adsorption point weight value computing;
recalculate at least one of the adsorption point weight values in response to detection of a change in the firearm type, at least one of the basic weight coefficients, and at least one of the visibility coefficients, or a combination thereof; and
re-adjust the triggering point according to the re-calculated adsorption point weight values.

19. A non-transitory computer readable storage medium comprising:
a plurality of instructions executable by a processor of an electronic device, the instructions comprising:
instructions executable by the processor to obtain a triggering operation for target positioning in a virtual interactive scene generated on a screen of the electronic device, the triggering operation performed by an input apparatus of the electronic device controlled by a user, the triggering operation causing the processor to display a triggering point on the screen, the triggering point indicating a location in the virtual interactive scene where the input apparatus is pointing;
instructions executable by the processor to obtain the location of the triggering point on the screen;
instructions executable by the processor to determine a plurality of adsorption point locations based on the location of the triggering point and a plurality of adsorption points on a virtual target in the virtual interactive scene generated on the screen, the adsorption point locations respectively associated with the adsorption points;
instructions executable by the processor to generate, in response to the location of the triggering point being within an adsorption range of at least one of the adsorption point locations, a plurality of adsorption point weight values corresponding to the adsorption points; and
instructions executable by the processor to adjust the triggering point on the screen from the location where the input apparatus is pointing to an adsorption point location at which an adsorption point on the virtual object corresponding to a largest adsorption point weight value is located.

* * * * *